United States Patent [19]

Kitayama

[11] Patent Number: 5,452,286
[45] Date of Patent: Sep. 19, 1995

[54] DIGITAL TRANSMISSION APPARATUS FOR SUBSCRIBERS HAVING SWITCHING FUNCTION FROM ACTIVE TRANSMISSION LINE TO PROTECTION TRANSMISSION LINE

[75] Inventor: Seiji Kitayama, Kawasaki, Japan

[73] Assignee: Fujitsu Limited, Kanagawa, Japan

[21] Appl. No.: 109,580

[22] Filed: Aug. 19, 1993

[30] Foreign Application Priority Data

Mar. 10, 1993 [JP] Japan .................................. 5-049500

[51] Int. Cl.⁶ ........................ H04L 1/22; H04Q 11/08
[52] U.S. Cl. ........................................ 370/16; 370/68
[58] Field of Search .................... 370/16, 16.1, 68, 53, 370/58.1; 375/38, 40; 455/8; 340/825.01, 827; 371/8.2

[56] References Cited

U.S. PATENT DOCUMENTS

| | | | |
|---|---|---|---|
| 4,967,406 | 10/1990 | Yagi et al. | 370/16 |
| 4,985,904 | 1/1991 | Ogawara | 455/8 |
| 5,010,550 | 4/1991 | Hirata | 455/8 |
| 5,014,261 | 5/1991 | Shinbashi et al. | 370/16 |
| 5,163,041 | 11/1992 | Moriyama | 370/16 |

*Primary Examiner*—Benedict V. Safourek

[57] ABSTRACT

A digital transmission apparatus for subscribers, includes a switch function unit performing multiplexing into subscriber time slots by receiving as its input transmission signals communicated between subscriber side transmission lines and feeder transmission lines. The apparatus sets one or more lines among a plurality of feeder transmission lines as a protection transmission line with respect to an active feeder transmission line. A selector function unit performs a connection changeover of the path of the active feeder transmission line in which a transmission fault occurred to a protection transmission line preliminarily allocated to the related active feeder transmission line.

13 Claims, 21 Drawing Sheets

Fig.13

| A4 | A3 | A2 | A1 | A0 | SELECTOR OUTPUT (DS1#n) |
|----|----|----|----|----|-------------------------|
| 0 | 0 | 0 | 0 | 0 | NONE IS SELECTED ("L" OUTPUT) |
| 0 | 0 | 0 | 0 | 1 | DS1#1' |
| 0 | 0 | 0 | 1 | 0 | DS1#2' |
| 0 | 0 | 0 | 1 | 1 | DS1#3' |
| 0 | 0 | 1 | 0 | 0 | DS1#4' |
| 0 | 0 | 1 | 0 | 1 | DS1#5' |
| 0 | 0 | 1 | 1 | 0 | DS1#6' |
| 0 | 0 | 1 | 1 | 1 | DS1#7' |
| 0 | 1 | 0 | 0 | 0 | DS1#8' |
| 0 | 1 | 0 | 0 | 1 | DS1#9' |
| 0 | 1 | 0 | 1 | 0 | DS1#10' |
| 0 | 1 | 0 | 1 | 1 | DS1#11' |
| 0 | 1 | 1 | 0 | 0 | DS1#12' |
| 0 | 1 | 1 | 0 | 1 | DS1#13' |
| 0 | 1 | 1 | 1 | 0 | DS1#14' |
| 0 | 1 | 1 | 1 | 1 | DS1#15' |
| 1 | 0 | 0 | 0 | 0 | DS1#16' |
| 1 | 0 | 0 | 0 | 1 | DS1#17' |
| 1 | 0 | 0 | 1 | 0 | DS1#18' |
| 1 | 0 | 0 | 1 | 1 | DS1#19' |
| 1 | 0 | 1 | 0 | 0 | DS1#20' |
| 1 | 0 | 1 | 0 | 1 | DS1#21' |
| 1 | 0 | 1 | 1 | 0 | DS1#22' |
| 1 | 0 | 1 | 1 | 1 | DS1#23' |
| 1 | 1 | 0 | 0 | 0 | DS1#24' |
| 1 | 1 | 0 | 0 | 1 | DS1#25' |
| 1 | 1 | 0 | 1 | 0 | DS1#26' |
| 1 | 1 | 0 | 1 | 1 | DS1#27' |
| 1 | 1 | 1 | 0 | 0 | DS1#28' |

($1 \leq n \leq 28$)

DIGITAL TRANSMISSION APPARATUS FOR SUBSCRIBERS HAVING SWITCHING FUNCTION FROM ACTIVE TRANSMISSION LINE TO PROTECTION TRANSMISSION LINE

BACKGROUND OF THE INVENTION

1. Field of the Invention

The present invention relates to a digital transmission apparatus for subscribers, more particularly to a digital transmission apparatus for subscribers which is disposed between a central office and a plurality of remote subscribers and, at the same time, is mainly constituted by a subscriber side transmission line wired on the remote subscriber side, a plurality of feeder transmission lines wired on the central office side, some of which are unused (protection transmission line) and the remainder of which are currently used (active), and a switch function unit which performs the switching of subscriber time slots with respect to transmission signals communicated between these subscriber side transmission line and feeder transmission lines.

In North America etc., subscribers served by a telephone company will frequently be scattered at remote locations. It is extremely uneconomical to establish a central office for each of these remote subscribers. Therefore, much use is now being made, in a group of remote subscribers, of a transmission mode in which a central office terminal (COT) which multiplexes subscriber analog signals transferred from an exchange, transforms the same to primary order group digital signals, and transmits the same via a common transmission line (feeder transmission line) to the vicinity of the group of remote subscribers is disposed in the central office and in which a remote terminal (RT) disposed in the vicinity of the group of remote subscribers demultiplexes the primary order group digital signals directed to the remote subscribers and distributes the signals to the subscribers via the subscriber side transmission line. The above-described system is a downstream system. For an upstream system from the remote subscribers toward the above-described central office terminal (COT), similarly, subscriber analog signals from the remote subscribers are converted to the digital signal and multiplexed by the above-described remote terminal, reach the above-described central office terminal via the above-described feeder transmission lines, are demultiplexed there, and then are input to the above-described exchange. The central office terminal (COT), feeder transmission lines, remote terminal (RT), and subscriber side transmission line referred to here constitute the abovementioned subscriber system digital transmission apparatus, which is called a "digital loop carrier (DLC)" in North America.

As the above-described feeder transmission lines, copper wires have been mainly used. The wire length usually reaches as long as several tens of kilometers, and therefore there is a high possibility of occurrence of certain transmission faults. Moreover, there also exists a high possibility of occurrence of a transmission fault since the copper wires themselves no longer function as a transmission media due to aged deterioration.

For this reason, in a digital transmission apparatus for subscribers (DLC), it is indispensable to provide an active/protection switch function at least for the feeder transmission lines, so that when a transmission fault occurs in any of the plurality of active feeder transmission lines, that line is smoothly switched to the protection transmission line, to thus maintain normal communication.

2. Description of the Related Art

A detailed explanation will be made later of a conventional digital transmission apparatus for subscribers (DLC) with reference to drawings.

In the current market, demand is now shifting from the conventional digital transmission apparatus for subscribers (DLC) to the next generation digital transmission apparatus for subscribers (NGDLC). There are various characteristics to this NGDLC, the greatest of which are: (1) the structure of the feeder transmission lines is changed from the conventional five- (four active + one protection) to a 28-line structure; (2) the remote terminal (RT) is further provided with a switch function unit for performing the switching of the subscriber time slots; (3) any one or several of the feeder transmission lines among the 28 feeder transmission lines can be freely determined as the protection transmission line. Note that, a detailed explanation will be given later also for the above-described next generation digital transmission apparatus for subscribers (NGDLC) with reference to the drawings.

To handle such a next generation digital transmission apparatus for subscribers (NGDLC), if the active/protection switching mechanism in the conventional digital transmission apparatus for subscribers (DLC) is used as is, the construction of the apparatus is conspicuously enlarged, and therefore there is a problem in that the demand that the remote terminal (RT) should be made as compact as possible cannot be satisfied. This is because, when the active/protection switching mechanism in the conventional digital transmission apparatus for subscribers DLC is used as is, it is necessary to ensure the space for containing enough units for switch-controlling the active/protection transmission lines and units for switching the active/protection transmission lines corresponding to the maximum number of protection transmission lines that can be expected (generally the internal portion of the remote terminal is constituted by a shelf accommodating these units). Also, the reason is that an enormous number of wires for containing subscriber lines multiplexed in 24 channels must be drawn from all of the 28 multiplexer/demultiplexer units on the backboard of the shelf with the assumption that any of the primary order group framing synchronization units and line interface units belonging to the 28 feeder transmission lines may be used by itself as a protection transmission line.

SUMMARY OF THE INVENTION

Therefore, the present invention, in consideration with the above-described problems, has as its object to provide a digital transmission apparatus for subscribers having an active/protection switch function which enables the setting of any of the transmission lines among the 28 active feeder transmission lines as the protection transmission line flexibly and without an enlargement of the size of the hardware.

To attain the above object, the present invention is constituted in that the switch function unit for performing the switching of the subscriber time slots received as its input the transmission signals communicated between the subscriber side transmission line and feeder transmission lines is further provided with a selector function unit for changing the path of the active feeder transmission line in which the transmission fault occurs over to the protection transmission line preliminarily allocated to the related active feeder transmission line. By this, the digital transmission apparatus for subscribers is made able to set one or several lines among a plurality of feeder transmission lines as a protection transmission line for an active feeder transmission line flexibly and without enlargement of the size of the hardware.

BRIEF DESCRIPTION OF THE DRAWINGS

The above object and features of the present invention will be more apparent from the following description of the preferred embodiments with reference to the accompanying drawings, wherein:

FIG. 13 is a view showing an example of a logic pattern of connection information given from a change-over control unit.

DESCRIPTION OF THE PREFERRED EMBODIMENTS

Before describing the embodiments of the present invention, the related art and the problems therein will be first described with reference to the related figures.

Figure 1:
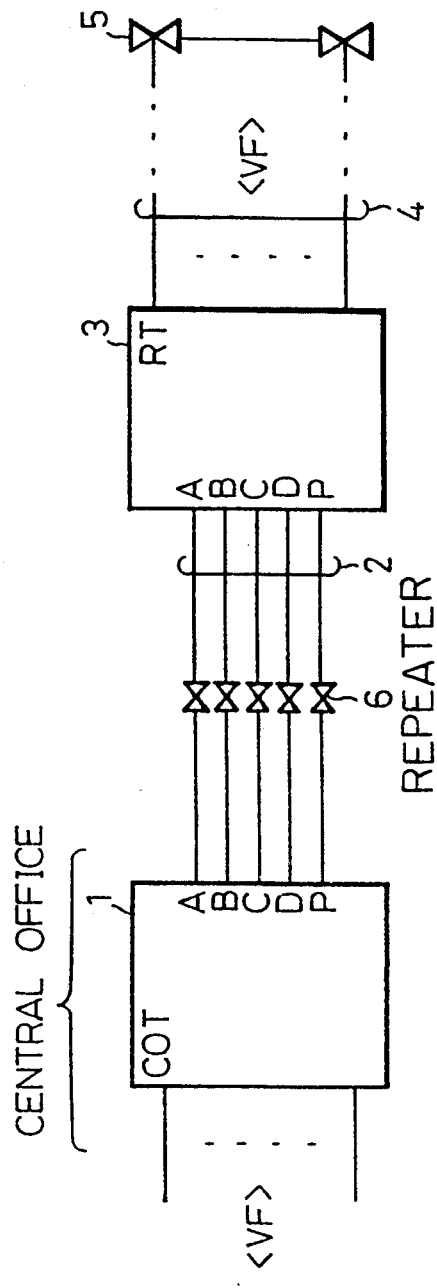
FIG. 1 is a block diagram showing a general digital transmission apparatus for subscribers.

FIG. 1 is a block diagram showing a general digital transmission apparatus for subscribers, a general description of which was given earlier, wherein the aforementioned central office terminal (COT) is indicated by a reference numeral 1, the feeder transmission line is indicated by 2, the remote terminal (RT) is indicated by 3, the subscriber side transmission line is indicated by 4, and the remote subscriber is indicated by 5, respectively. Reference numeral 6 is a repeater.

In the figure, VF represents a voice frequency signal. Also, A, B, C, and D are symbols for discriminating four active feeder transmission lines 2. The transmission line discriminated by P (protection) is the protection transmission line for performing the backup of a faulty transmission line when a transmission fault occurs in any of these four active feeder transmission lines 2.

Usually local analog switches (LAS) exist on the left side from the central office in the figure. The subscriber analog speech line signals from the LAS's are input to the central office terminal (COT) 1. There, 24 channels worth of subscriber analog speech line signals are multiplexed to a primary order group digital signal (DS1/T1) and transmitted via the corresponding feeder transmission lines 2 to the remote terminal (RT) 3. Also, usually a system accommodating 96 subscriber lines is adopted in both of the central office terminal 1 and the remote terminal 3. Therefore, the number of the feeder transmission lines 2 becomes the above-described four (=96/24) lines.

Note that, as a system structure including this digital transmission apparatus for subscribers, other than the above-mentioned structure of an LAS+COT1+RT3, there also exists a structure in which a local digital switch (LDS) having both the functions of an LAS and COT1 is replaced by the above-described COT1. In any case, however, both of the COT1 and LDS are recognized to be quite equivalent when viewed from the RT3.

Figure 2:
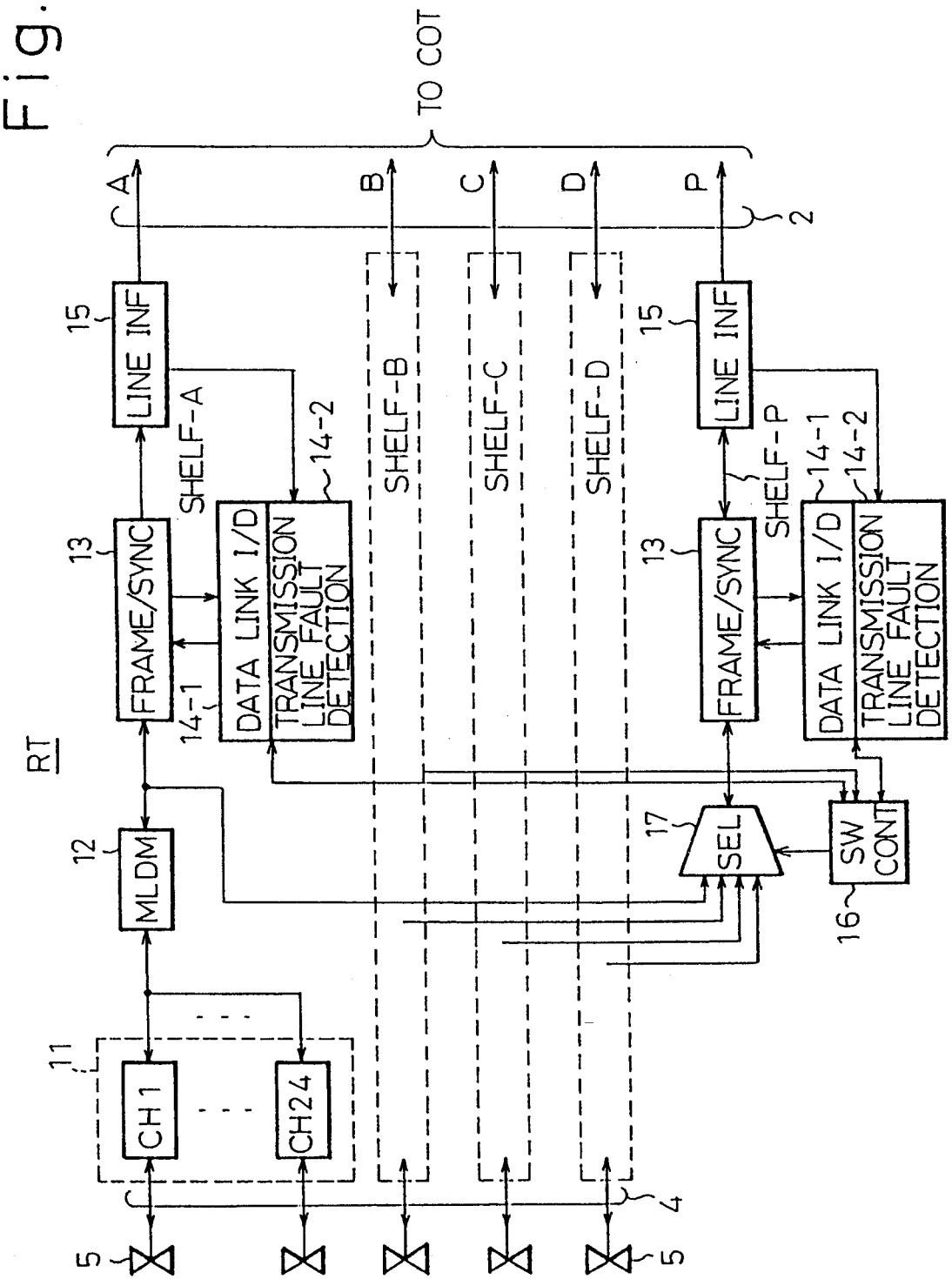
FIG. 2 is a view for explaining an active/protection switch function in FIG. 1.

FIG. 2 is a view for explaining the active/protection switch function in FIG. 1 and mainly shows the part of the remote terminal (RT). This remote terminal comprises four active parts A, B, C, and D (Shelf-A, ..., Shelf-D) and one protection part indicated by P (Shelf-P). These parts (shelf) have almost the same structure as each other. Accordingly, only the parts of A and P will be drawn in detail as representations.

When viewing the active/protection switch function in FIG. 2, one protection transmission line (P) is provided with respect to four active feeder transmission lines (A, ..., D). When a fault occurs in a certain feeder transmission line, the transmission line fault detection unit 14-2 belonging to that part detects this fault and transfers this information to the active/protection switching control unit (SW-Cont) 16. This active/protection switching control unit 16 controls the active/protection transmission line switching unit (SEL) 17 in accordance with that switching information and switches the path of for example the active feeder transmission line A in which a fault has occurred to the protection transmission line P. Thus, the active/protection switching operation is completed, and the line is restored from that fault.

Note that, the reference numeral 11 in the figure is an interface unit corresponding to each channel (CH), interfaces with the corresponding subscriber side transmission line 4, and performs operations such as a digital/analog conversion. These interface units 11 are connected to the multiplexer/demultiplexer unit (MLDM)

12 and perform the conversion between the primary order group digital signals and subscriber analog line signals. The multiplexer/demultiplexer unit 12 is further connected to a primary order group framing synchronization unit (Frame/Sync) 13. In this primary order group framing synchronization unit 13, a framing bit etc. are added to the transmission signal to the feeder transmission line 2. Conversely, extraction of the framing bit is carried out for the transmission signal from the feeder transmission line 2 to establish the frame synchronization. Also, it cooperates with a data link insertion/drop unit (Insert/Drop) 14-1, puts a supervisory signal such as fault information on the data link, or drops the supervisory signal such as a fault information carried on the data link. Reference numeral 15 is a line interface unit (Line Inf), which achieves interface with the feeder transmission lines 2 and performs for example a bipolar-unipolar conversion or an inverse conversion to this.

Figure 3:
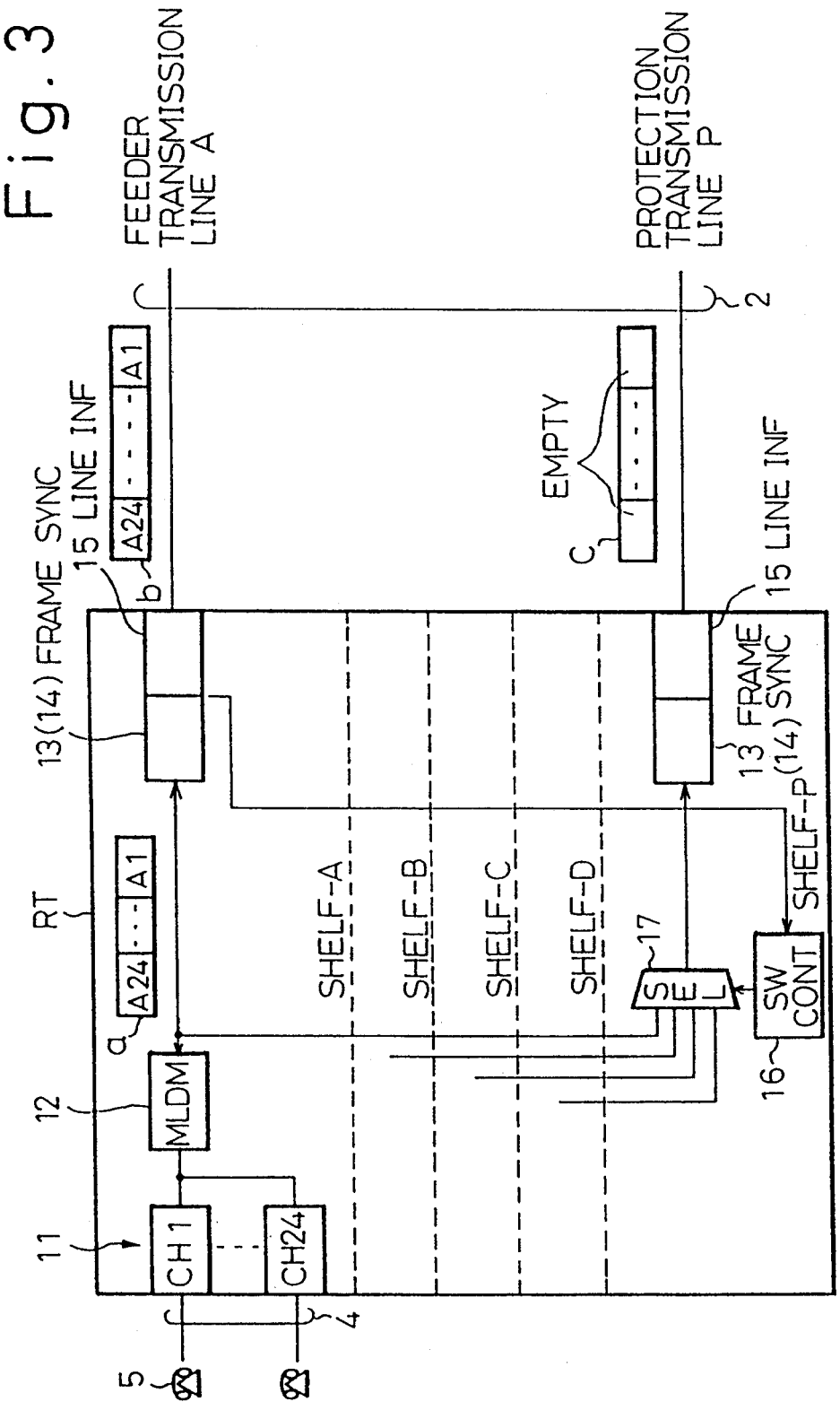
FIG. 3 is a view diagrammatically showing a normal state free from a transmission fault in FIG. 2.
Figure 4:
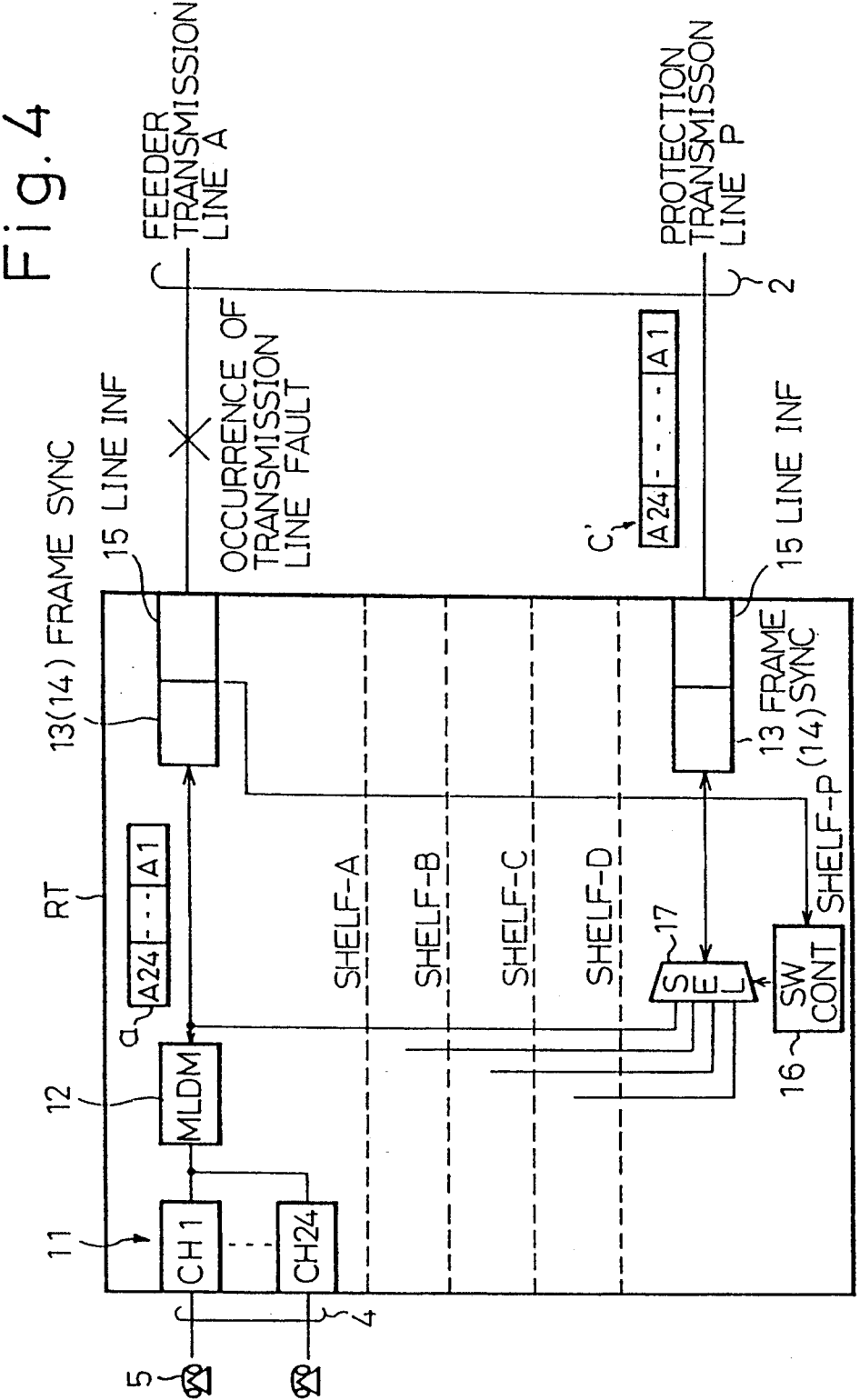
FIG. 4 is a view diagrammatically showing a state in which a fault occurs in the feeder transmission line in FIG. 2.

FIG. 3 is a view diagrammatically showing the normal state free from a transmission fault in FIG. 2, and FIG. 4 is a view diagrammatically showing the state in which a fault occurs in a feeder transmission line in FIG. 2. Note that, similar constituent elements are represented by the same reference numerals or symbols throughout all the figures. In FIG. 3, the subscriber signals converted to the 0-th order group signals DS0 at the interface unit 11 are multiplexed in 24 channels in the multiplexer/demultiplexer unit 12. The signal is represented by a in the figure. Twenty-four channels worth of the signals of the system A are multiplexed in that frame. This signal a is subjected to the aforementioned processing at the primary order group framing synchronization unit 13 (for convenience, blocks 14-1 and 14-2 of FIG. 2 are drawn contained in this) or at the line interface unit 15. This signal is transmitted to the feeder transmission line A. At this time, the corresponding signal c on the protection transmission line P side is unused, and the subscriber time slots other than the previously mentioned data link are "empty". In this case, they are regarded as "empty" for easy understanding, but actually the data of the transmission line A or a pseudo random signal is inserted.

Here, it is assumed that a fault occurs on the feeder transmission line A, as shown in FIG. 4. Information on this fault is notified to the active/protection switching control unit 16. The transmission path on the active feeder transmission line A side is pulled into the protection transmission line P side at the active/protection transmission line switching unit 17, to relieve the transmission line A from that fault.

As mentioned in the aforesaid section entitled the "Description of the Related Art", the current market is now shifting to a next generation subscriber system digital transmission apparatus (NGDLC), which NGDLC has the previously mentioned three great characteristics (1), (2), and (3).

Figure 5:
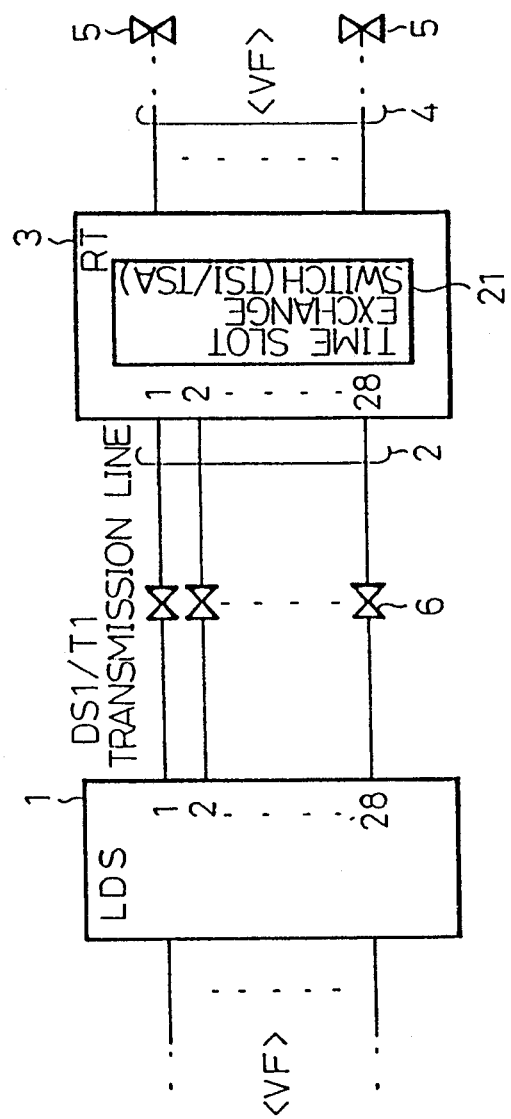
FIG. 5 is a view showing a representative example of a next generation digital transmission apparatus for subscribers.

FIG. 5 is a view showing a representative example of a next generation subscriber system digital transmission apparatus and corresponds to the previously mentioned FIG. 1. The difference from the conventional structure of FIG. 1 is that a switch function unit (TSI/TSA) 21 performing the switching between 28 feeder transmission lines 2 and the subscriber time slot is introduced. Here, TSI/TSA is an abbreviation of time slot interchange/time slot assignment.

As mentioned previously, however, if the active/protection switching mechanism in the conventional digital transmission apparatus for subscribers (DLC) is used as is to handle such a next generation subscriber system digital transmission apparatus (NGDLC), the construction of the apparatus is conspicuously enlarged, to cause a problem in that demands that the remote terminal (RT) should be made as compact as possible cannot be satisfied.

The present invention will be explained below.

Figure 6:
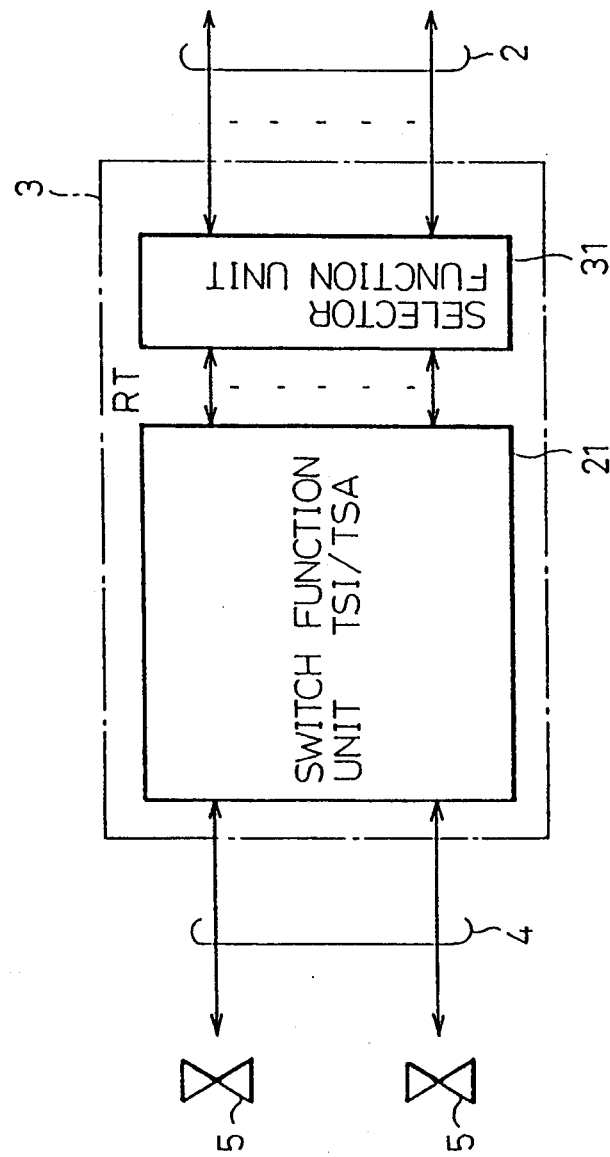
FIG. 6 is a block diagram showing the structure of the principle of a first mode of the present invention.

FIG. 6 is a block diagram showing the structure of the principle of a first mode of the present invention. The constituent elements serving as the prerequisites of the digital transmission apparatus for subscribers according to the present invention are, as mentioned previously with reference to FIG. 5, (1) subscriber side transmission line 4 disposed between the central office and a plurality of remote subscribers 5 and wired on the remote subscriber side; (2) a plurality of feeder transmission lines 2 wired on the central office side, some of which are unused (protection transmission lines) and the remainder of which are currently used (active); and (3) a switch function unit 21 which performs the switching of the subscriber time slots with respect to the transmission signals communicated between these subscriber side transmission line 4 and feeder transmission lines 2, wherein, when a transmission fault of the transmission signal occurs, changes the connection of the active feeder transmission line in which the related transmission fault occurs over to the protection transmission line and relieves the system from that transmission fault.

Referring to FIG. 6, the constituent element newly introduced by the present invention is a selector function unit 31. This selector function unit 31 is further provided between the switch function unit 21 and the feeder transmission line 2 and functions, when the transmission fault occurs, to change over the path of the active feeder transmission line in which the related transmission fault is produced to connection to the protection transmission line allocated to the related active feeder transmission line.

Figure 7:
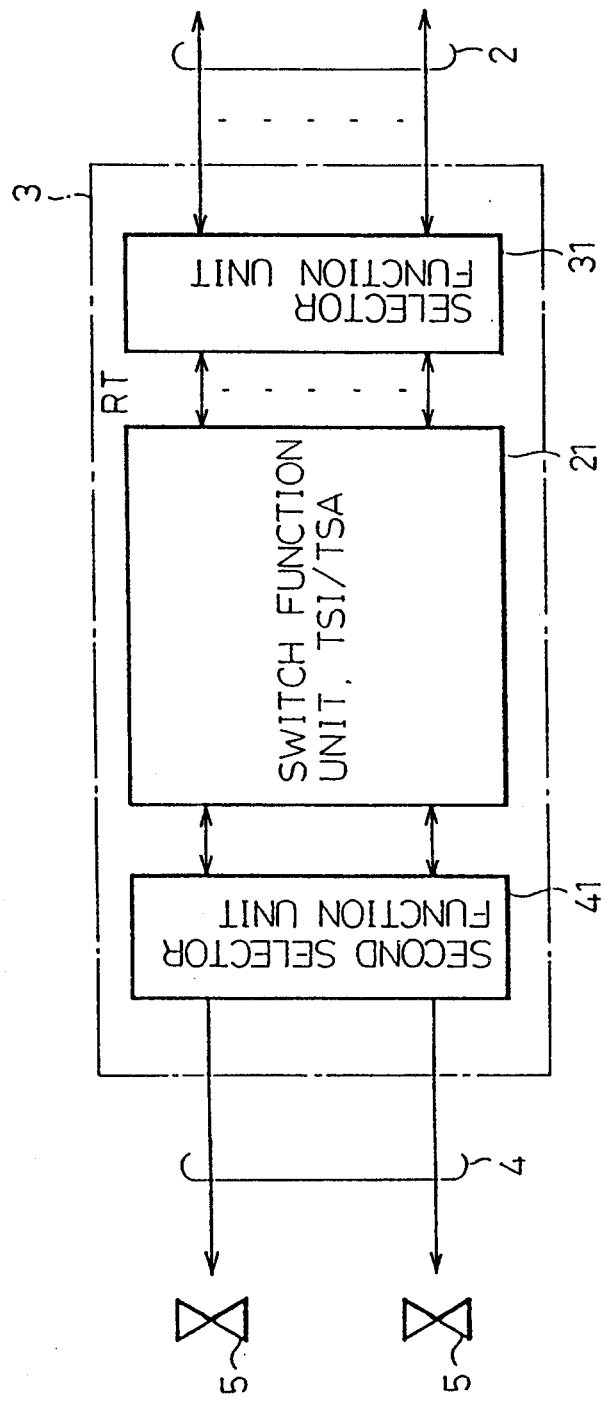
FIG. 7 is a block diagram showing the structure of the principle of a second mode of the present invention.

Also, FIG. 7 is a block diagram showing the structure of the principle of a second mode of present invention. In this second mode, the subscriber side transmission line 4 comprises a plurality of subscriber side transmission lines, some of which are unused and the remainder of which are currently used. When a transmission fault occurs in the currently used subscriber side transmission line, and a second selector function unit 41 which performs the change-over so that the currently used subscriber side transmission line in which the transmission fault is produced is made unused and the subscriber side transmission line which has been unused is used in place of the former is inserted to between the switch function unit 21 and the subscriber side transmission line 4.

Figure 8:
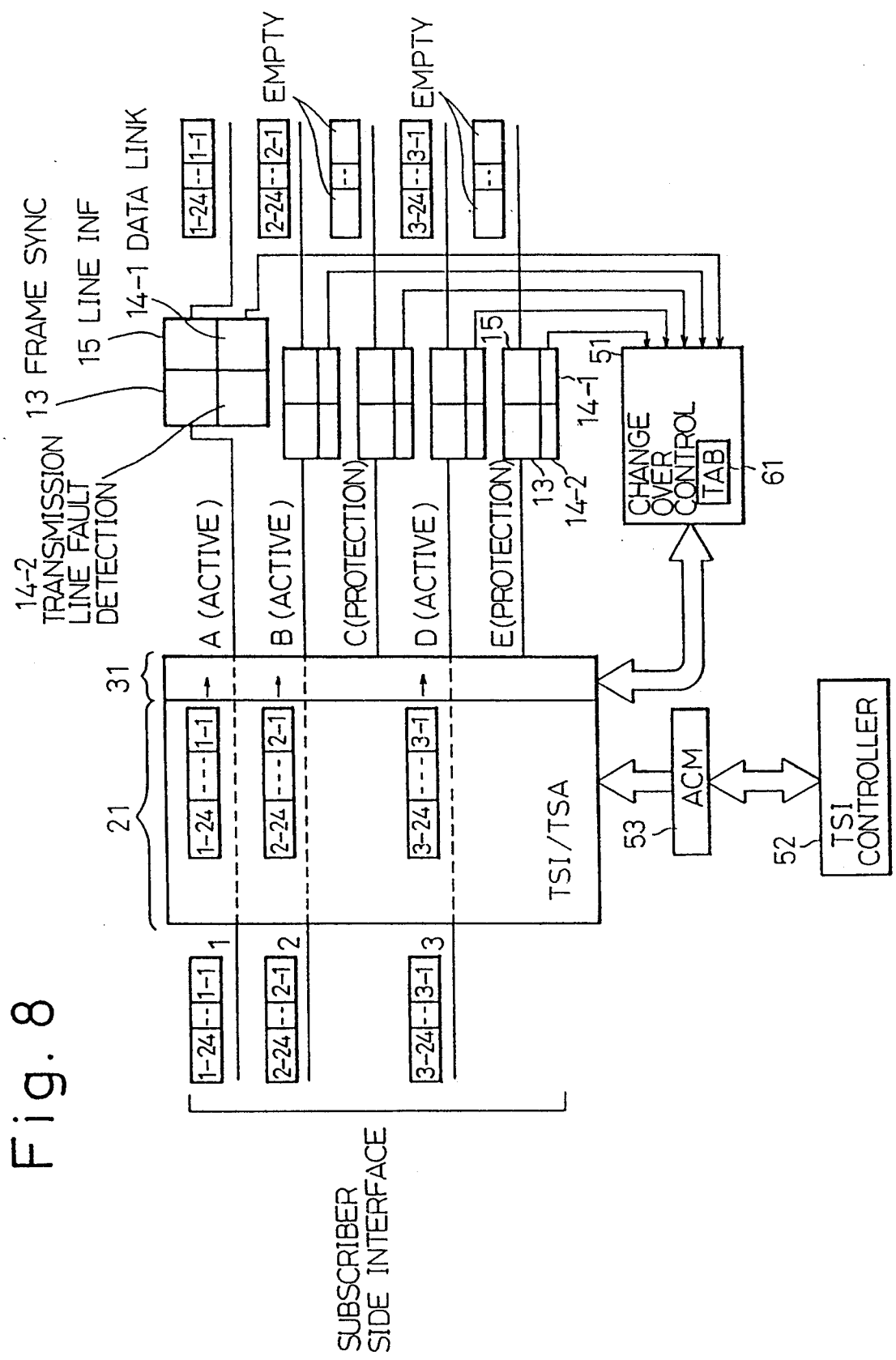
FIG. 8 is a view diagrammatically showing the operation of the present invention in a normal mode.
Figure 9:
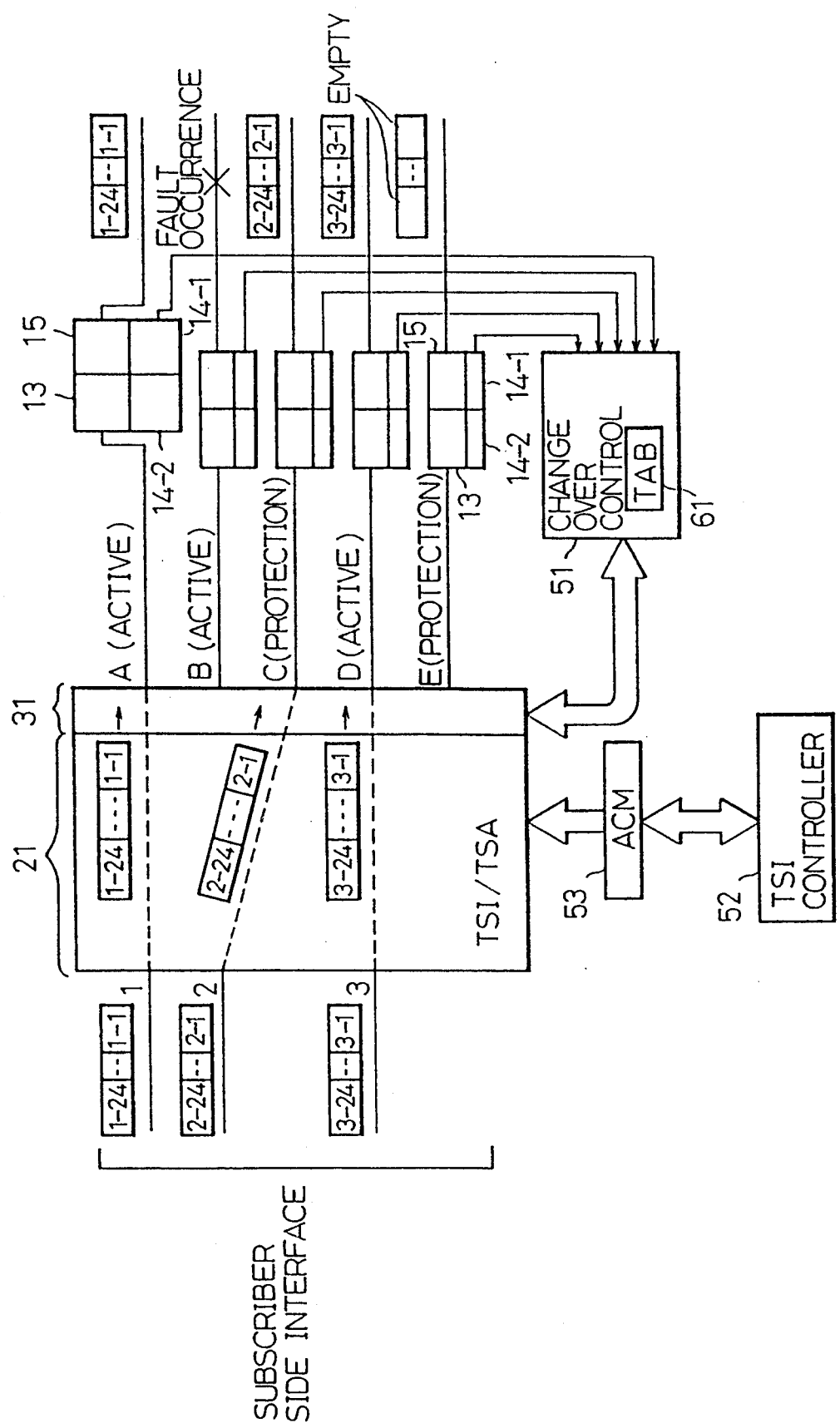
FIG. 9 is a view diagrammatically showing the operation of the present invention when a fault occurs.

FIG. 8 is a view diagrammatically showing the operation of the present invention in the normal mode, and FIG. 9 is a view diagrammatically showing the operation of the present invention when a fault occurs. In FIG. 8, the aforementioned switch function unit 21 and selector function unit 31 are integrally drawn, and the internal transmission paths are represented by dotted lines. Data frames drawn along respective dotted lines (1-24, . . . , 1-1) are equivalent to the data frames a indicated in for example FIG. 3. Also, for simplification, several lines among 28 transmission paths (1, 2, and 3 on input side and A, B, C, D, and E on output side) are extracted and indicated. These correspondence relationships are preliminarily allocated by presetting by an external apparatus in a fixed manner.

Here, it is assumed that a transmission fault occurs in for example a feeder transmission line B. Then, the transmission path is changed over from the route of 2-B shown in FIG. 8 to the route of 2-C shown in FIG. 9. Note, connection information indicating that, for example, both of the transmission path 1-A and the transmission path 2-B use the feeder transmission line C as the change-over path at the time of a fault and that the transmission path 3-D uses the feeder transmission line E as the change-over path at the time of a fault is preliminarily determined at the set-up of the related transmission system. The selector function unit carries out such a change-over of paths.

In FIG. 8 and FIG. 9, the primary order group framing synchronization unit 13, data link insert/drop unit 14-1, transmission line fault detection unit 14-2 and line interface unit 15 disposed on the right side of the selector function unit 31 are the same as the conventional constituent elements already explained with reference to FIG. 2. A path change-over instruction does not exist in the data link information where the feeder transmission line is normal. However, if a transmission fault occurs in the feeder transmission line B as in the above-described example, it is instructed to the central office terminal 1 via the normal upstream data link that a change-over to the protection transmission line C be carried out. This instruction is transferred from the transmission line fault detection unit 14-2 to the change-over control unit 51, and the change-over control unit changes over the path in the selector function unit 31 from the path of FIG. 8 to the path of FIG. 9 based on this.

Note that, the TSI controller 52 and the address control memory 53 are control systems originally existing for performing the switching of the subscriber time slots carried out in the switch function unit 21, and the TSI controller 52 determines information on which subscriber and which subscriber are to be connected in accordance with the call originating information of the subscriber. Further, the address control memory 53 outputs the time slot data to be written in the memory acting as the switch function unit 21 and the write and read address of the time slot data to be read from that memory in accordance with this.

Thus, it is possible to set any transmission line among the 28 active feeder transmission lines as the protection transmission line flexibly and without enlargement of the size of the hardware just by the addition of the selector function unit 31.

Figure 10:
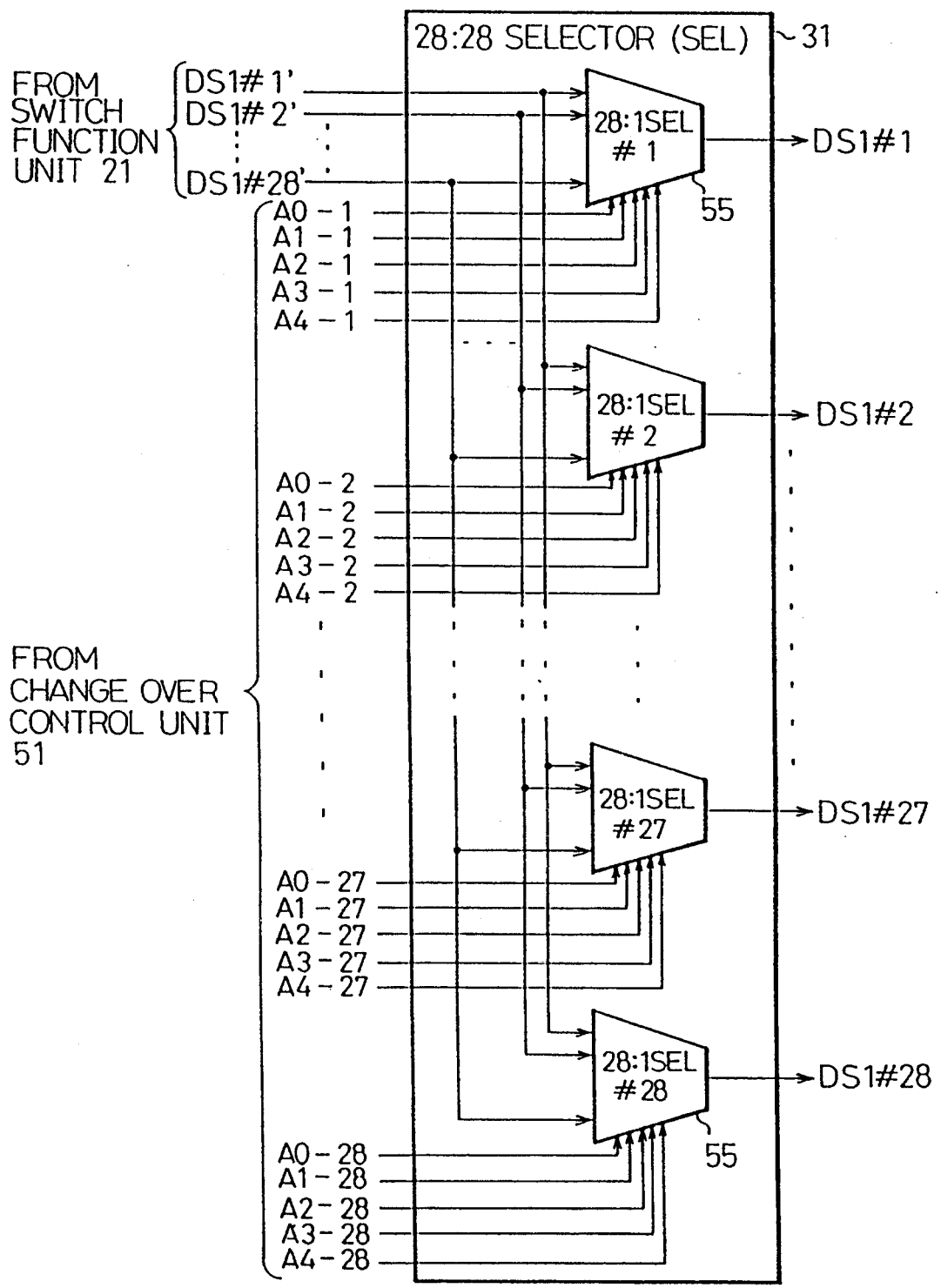
FIG. 10 is a view showing a concrete example of a selector function unit.

FIG. 10 is a view showing one structural example of the selector function unit. The selector function unit 31 is a 28:28 selector which performs the route selection for any 28 outputs by receiving outputs of 28 lines (DS1#1', ..., DS1#28') from the switch function unit 21 as its inputs and is realized by providing 28 illustrated 8:1 selectors (SEL) 55. Each of the 28:1 selectors (SEL) 55 receives as its inputs the outputs of the above-described 28 lines commonly. To which path the route selection is to be carried out is designated by selector control signals from the change-over control unit 51 (A0-1, A1-1, ..., A0-2, A1-2, ..., A0-28, A1-28, ...). DS1#1, DS1#2, ..., DS1#28 on the right side in the figure indicate the paths after the route selection is carried out by the selector control signal. Note, in the example indicated in the present figure, a state not performing the route switching is shown.

Figure 11:
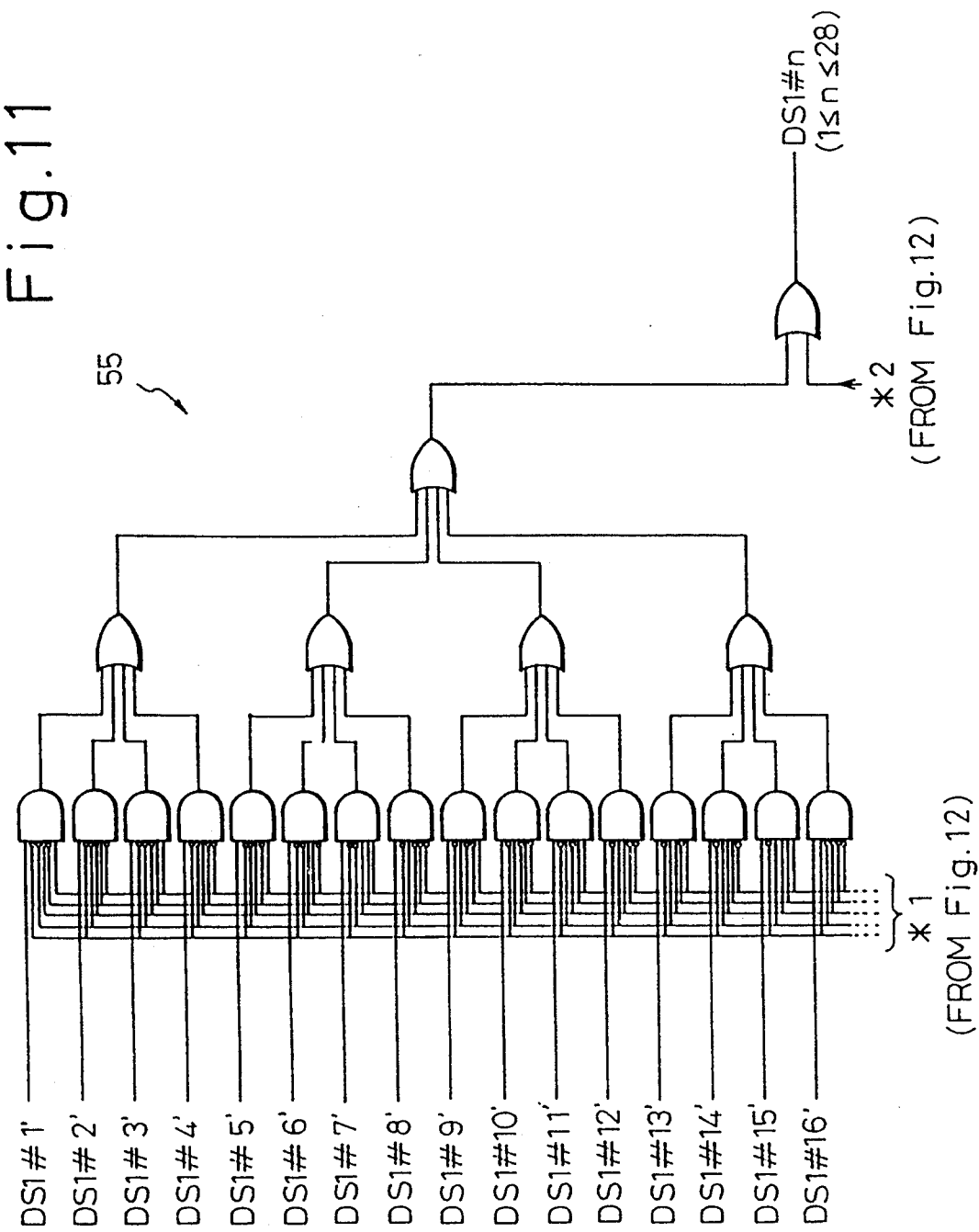
FIG. 11 is a view showing a detailed example of a 28:1 selector shown in FIG. 10 (part 1)
Figure 12:
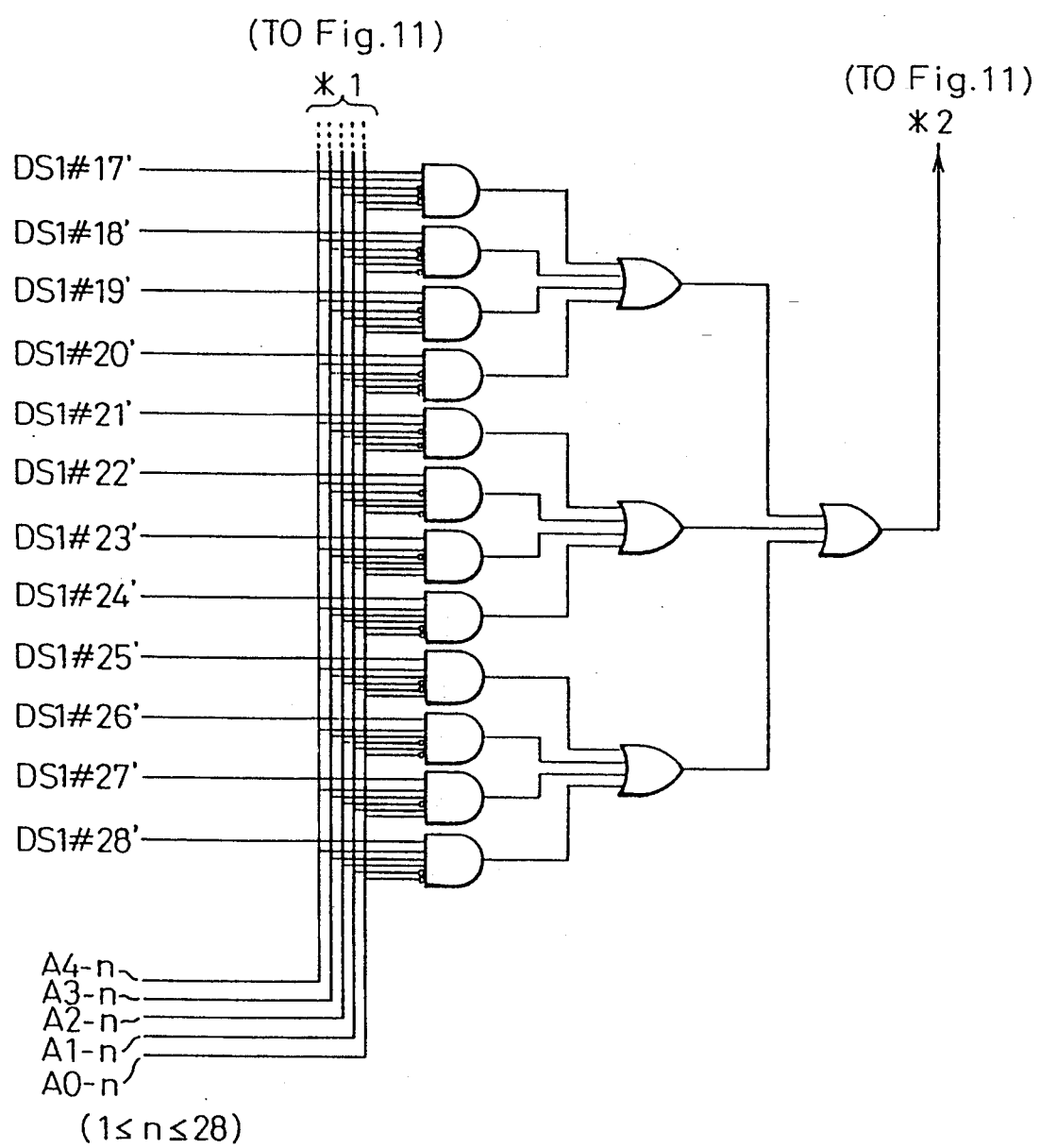
FIG. 12 is a view showing a detailed example of a 28:1 selector shown in FIG. 10 (part 2)

FIG. 11 is a view showing a detailed example of a 28:1 selector shown in FIG. 10 (No. 1); and FIG. 12 is a view showing a detailed example of a 28:1 selector shown in FIG. 10 (No. 2). DS1#1', DS1#2', ..., and DS1#28' indicated on the left side of FIG. 11 and FIG. 12 correspond to DS1#1', DS1#2', ..., and DS1#28' shown on the left side of FIG. 10. As illustrated, each 28:1 selector 55 comprises logic gates provided in correspondence to the aforesaid feeder transmission lines (in the example of the figure, it comprises a combination of an AND gate group and an OR gate group, but the structure is not restricted to this, and various structures can be realized). The logic gates receive as their control inputs the aforesaid connection information from the change-over control unit 51 (A0-n, A1-n, A2-n, ..., A4-n) and form the connection paths. Note that, n indicates any of the ID Nos. displayed in the 28:1 selectors of FIG. 10 (#1, #2, ..., and #28).

FIG. 13 is a view showing an example of a logic pattern of the connection information given from the change-over control unit 51. The aforesaid connection information from the abovementioned change-over control unit 51 (A0-n, A1-n, A2-n, ..., A4-n) select one transmission path according to the illustrated respective logic patterns. For example, when it is assumed that A0, A1, A2, A3, A4=10100 for the third selector output (n=3), the data frame of DS1#5' will flow in this third selector output.

As mentioned previously, when a transmission fault is detected, a change-over control unit 51 which outputs the connection information for the connection switch to the selector function unit 21 in accordance with the related transmission fault information is provided. For this purpose, the change-over control unit 51 includes a management table (TAB) 61 (refer to FIG. 8 and FIG. 9), records the connection information (A0, A1, A2, A3, A4) corresponding to each of the respective types of transmission fault information in the management table 61, and, at the same time, updates the same to new connection information when the change-over of the active/protection state is completed. For example, in FIG. 9, the transmission path C which now becomes the active path due to the occurrence of a fault becomes impossible to be used as the protection transmission line in that management table, and therefore the table is rewritten for updating it.

Figure 14:
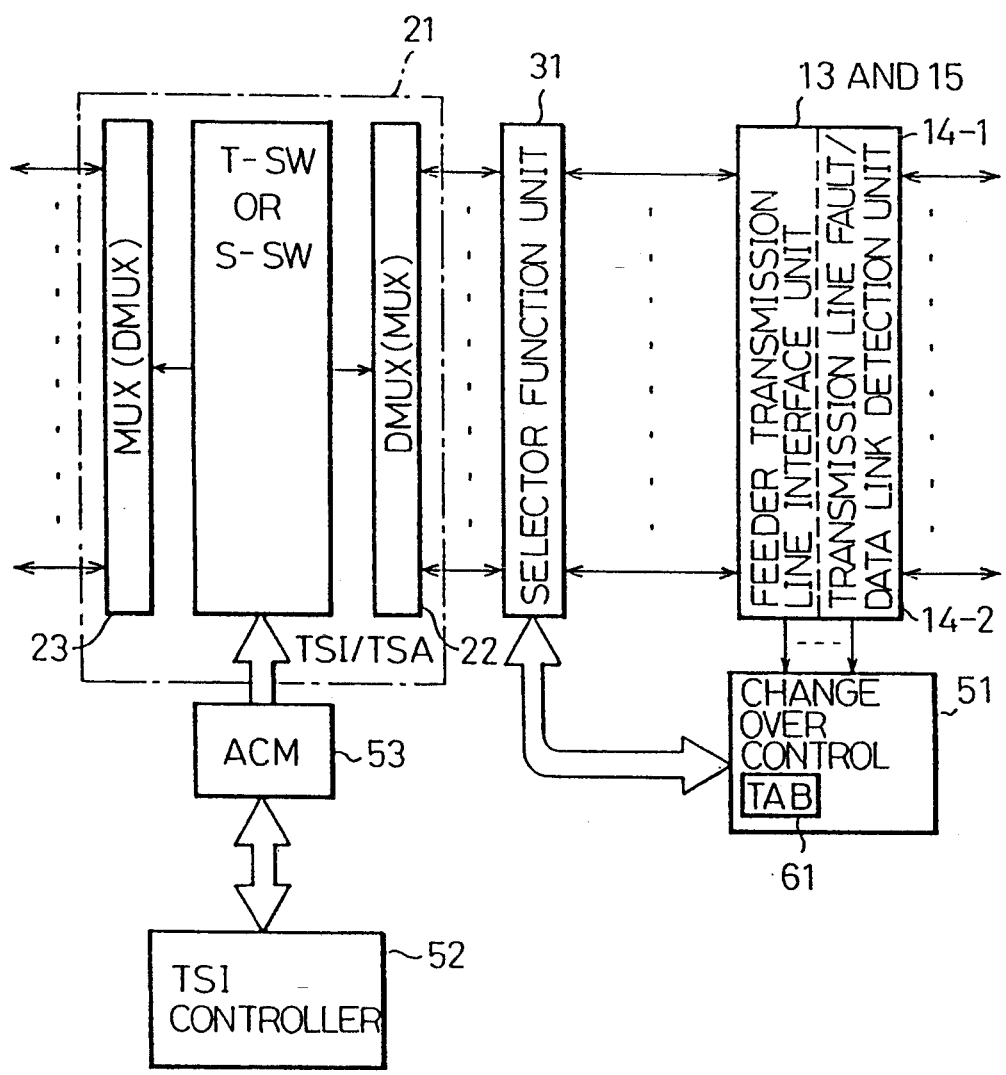
FIG. 14 is a view concretely showing a switch function unit in FIG. 8.

FIG. 14 is a view concretely showing a switch function unit 21 in FIG. 8. Note that, blocks 13, 14-1, 14-2, and 15 on the right side in the figure simply draw blocks 13, 14-1, 14-2, and 15 indicated in FIG. 8.

As shown in FIG. 14, the switch function unit 21 comprises a time-switch performing the switching of the subscriber time slot or a space-switch disposed at the center portion thereof, in which multiplexer/demultiplexer units (MUX/DMUX) 22 and 23 are provided at the input and output stages thereof. In the figure, the multiplexer unit (MUX) 23 and demultiplexer unit (DMUX) 22 act with respect to the flow of the signal from the left to right in the figure, and the multiplexer unit (MUX) 22 and demultiplexer unit (DMUX) 23 act with respect to the flow of the signal from the right to left in the figure.

Figure 15:
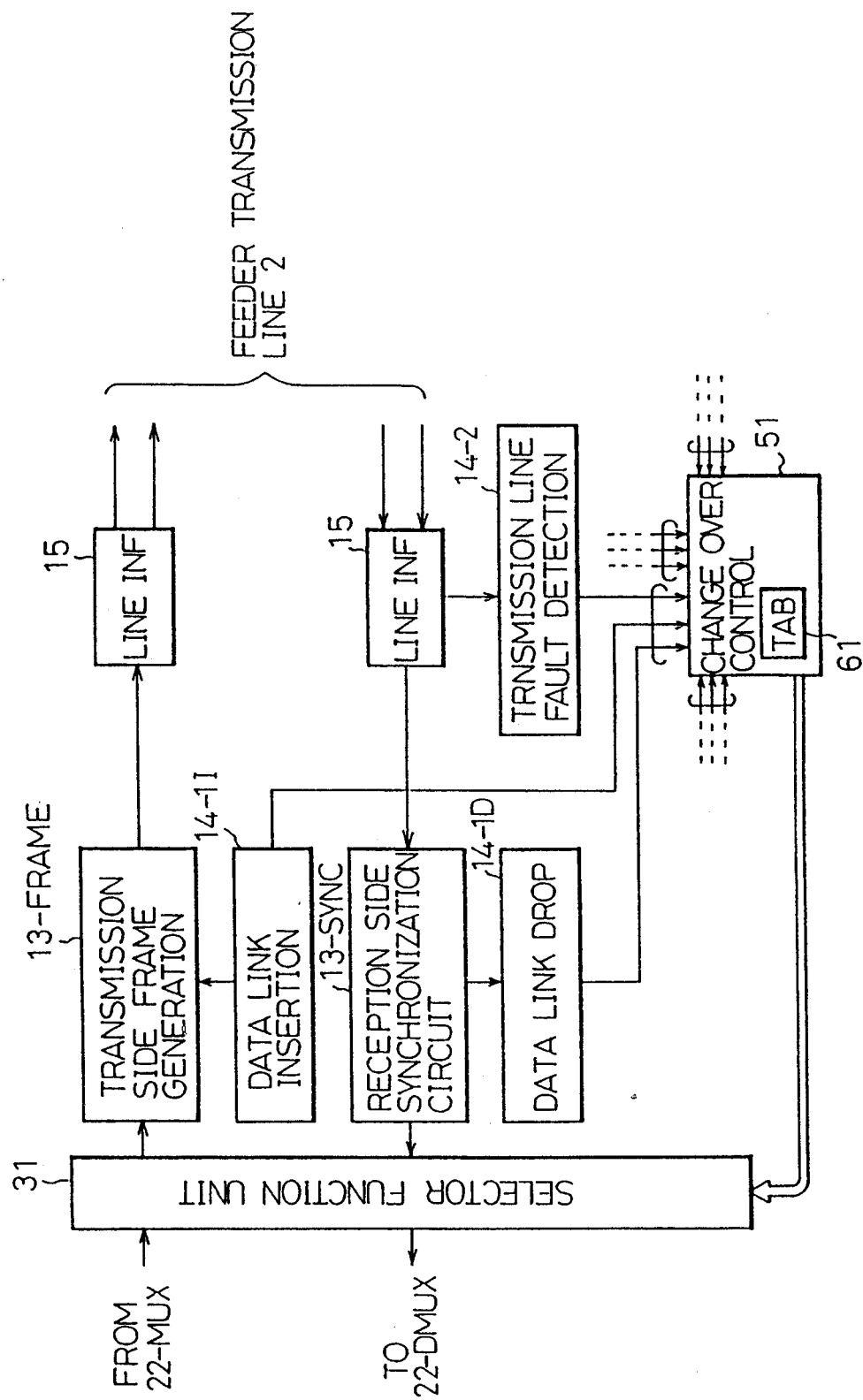
FIG. 15 is a view showing the structure on the right side from the selector function unit in FIG. 14 for easy understanding.

FIG. 15 is a view showing the structure of the right side from the selector function unit 31 in FIG. 14 for easy understanding. All of the abovementioned diagrams are expressed for common use upstream and downstream for simplification, but actually, as shown in FIG. 15, the systems are constituted separately for upstream and downstream use. Note that the blocks in the present figure other than the blocks 31 and 51 show only a part corresponding to one among 28 feeder transmission lines, and actually a similar remaining 27 sets of blocks exist in parallel.

Figure 16:
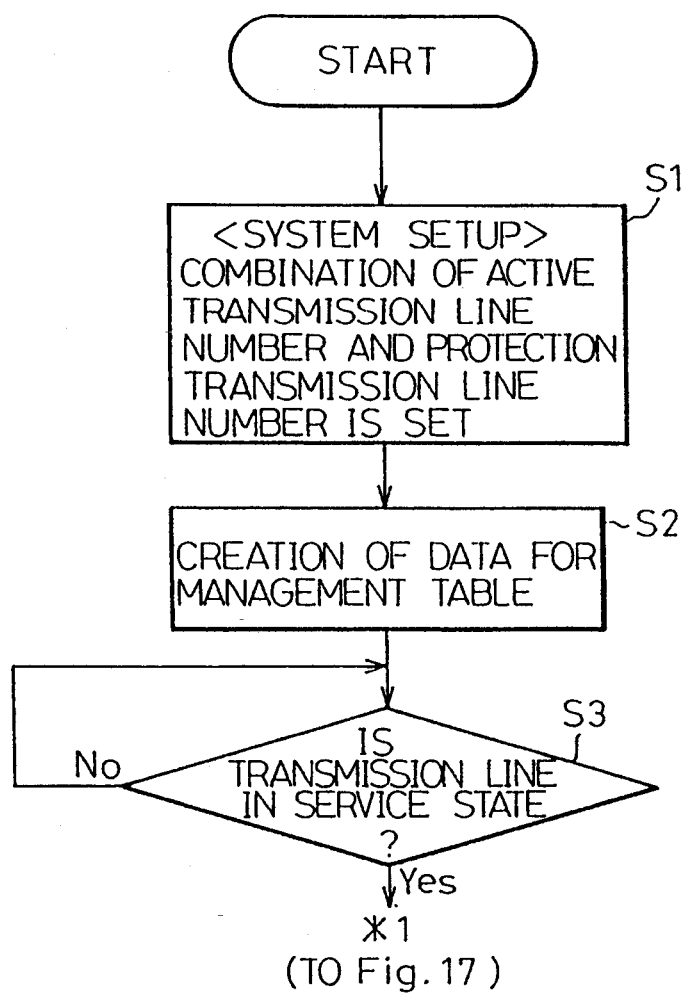
FIG. 16 is a flow chart showing an example of the operation of the change-over control unit (part 1)
Figure 17:
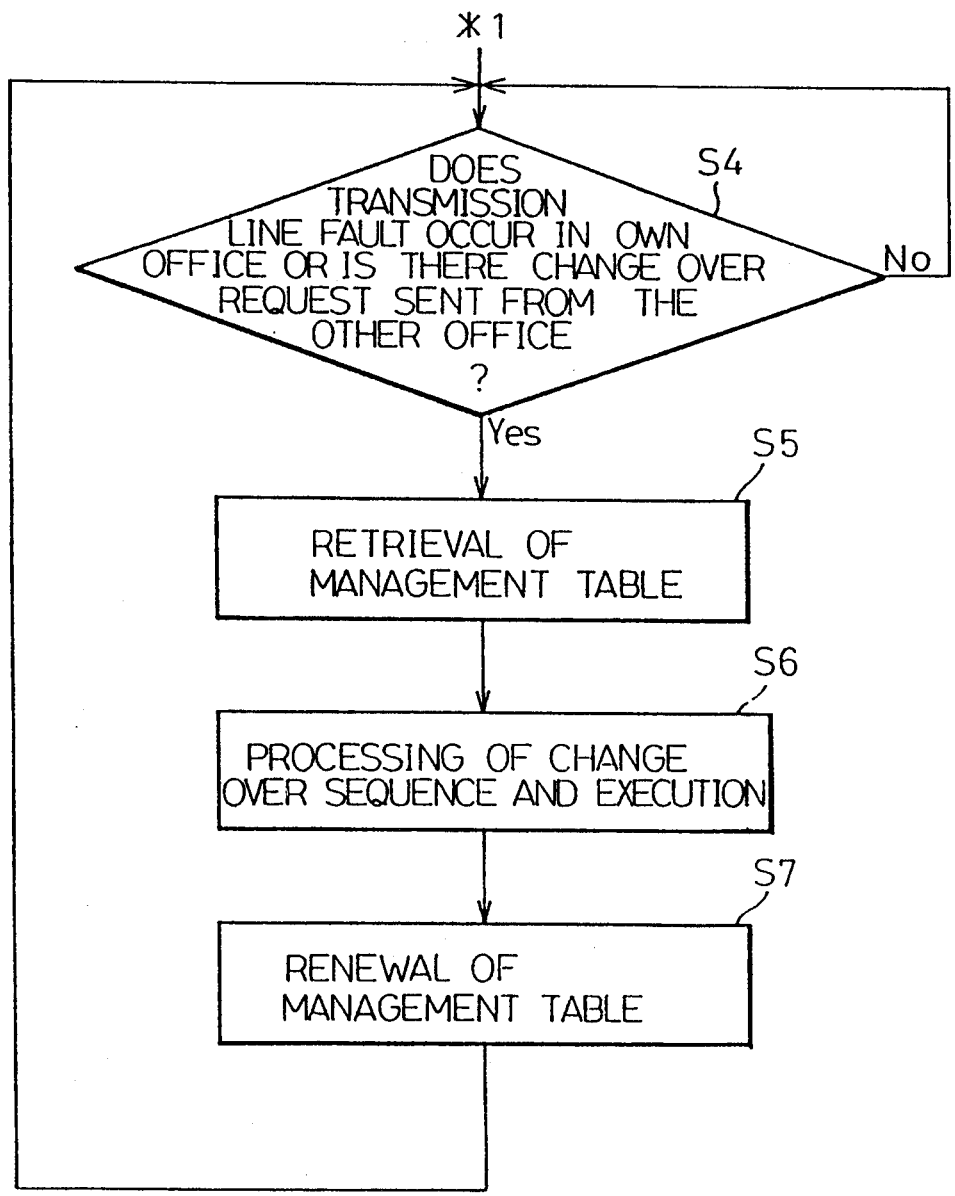
FIG. 17 is a flow chart showing an example of operation of the change-over control unit (part 2)

FIG. 16 and FIG. 17 are flow charts showing one example of operation in the change-over control unit 51.

At step S1, a host computer (not illustrated) exercising general control over the related digital transmission system for subscribers determines for the change-over control unit 51 which line among the 28 lines is to be used as the active feeder transmission line, which line is to be used as the protection transmission line, and which active feeder transmission line is to be subjected to backup by that protection transmission line. Where the determination is not carried out, the set-up operation is effected by default values possessed by the apparatus.

At step S2, the connection information to be loaded in the management table (TAB) 61 is prepared.

When it is decided at step S3 that the system is in the middle of communication, the presence/absence of a transmission fault is monitored at step S4 and when a transmission fault exists, (Yes) is selected, and it is derived from the management table 61 at step S5 by which protection transmission line the transmission line of the related transmission fault is to be relieved.

At step S6, processing for actually controlling the selector function unit 31 is entered.

At step S7, the management table 61 is updated so as to conform to the new mode after the active/protection change-over.

Figure 18:
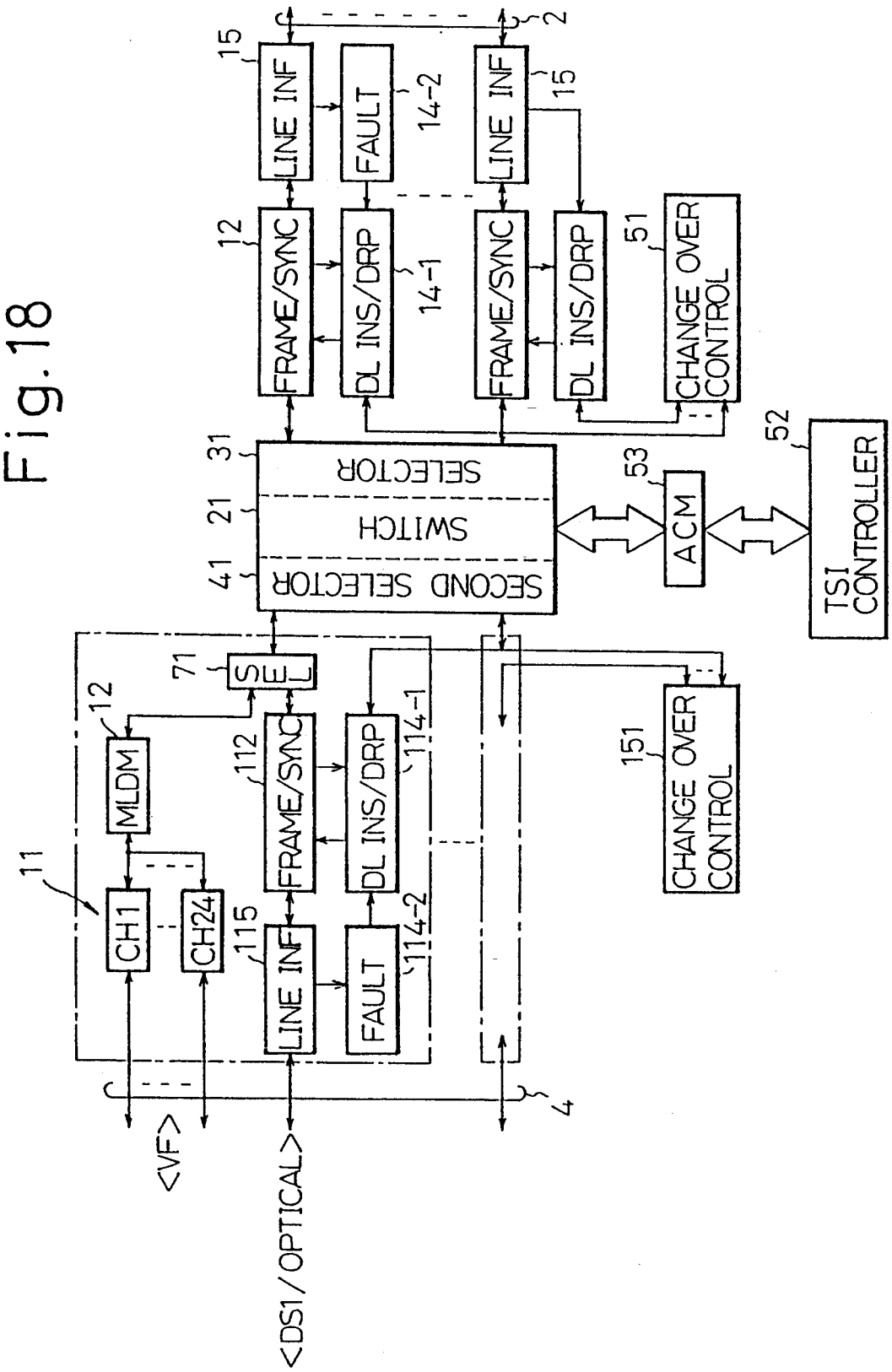
FIG. 18 is a view showing a concrete example of the second mode shown in FIG. 7, FIG. 19 a view showing a concrete example of a transmission line fault detection unit and the vicinity thereof, FIG. 20 a view showing a first example of a system to which the present invention is applied, and FIG. 21 a view showing a second example of a system to which the present invention is applied.

FIG. 18 is a view showing a concrete example of the second mode shown in FIG. 7. In this second mode, when a transmission fault occurs, a second selector function unit 41 for performing the change-over of connection from the path of the active subscriber side transmission line in which the related transmission fault occurs to the protection subscriber side transmission line allocated to the related subscriber side transmission line is further inserted between the switch function unit 21 and the subscriber side transmission line 4, so the reliability of the communication can be further improved. In the present figure, the second selector function unit 41 is a part which should be particularly noted and is disposed on the subscriber side with respect to the switch function unit 21. In the figure, when it is assumed that the block indicated by the one dot chain line is the subscriber side transmission line of one unit, several lines among them are allocated in advance as the protection subscriber side transmission lines. They are used while performing the change-over for the subscriber side transmission line in which the transmission fault occurred. Note that, the structure of the second selector function unit 41 is basically the same as that indicated in FIGS. 10, 11, and 12.

In FIG. 18, the selector (SEL) 71 is indicated. This is for alternately selecting either of the usual transmission of VF signal and DIS signal by light and for transmitting the same when subscribers having a large communication data capacity are accommodated in the future.

Figure 19:
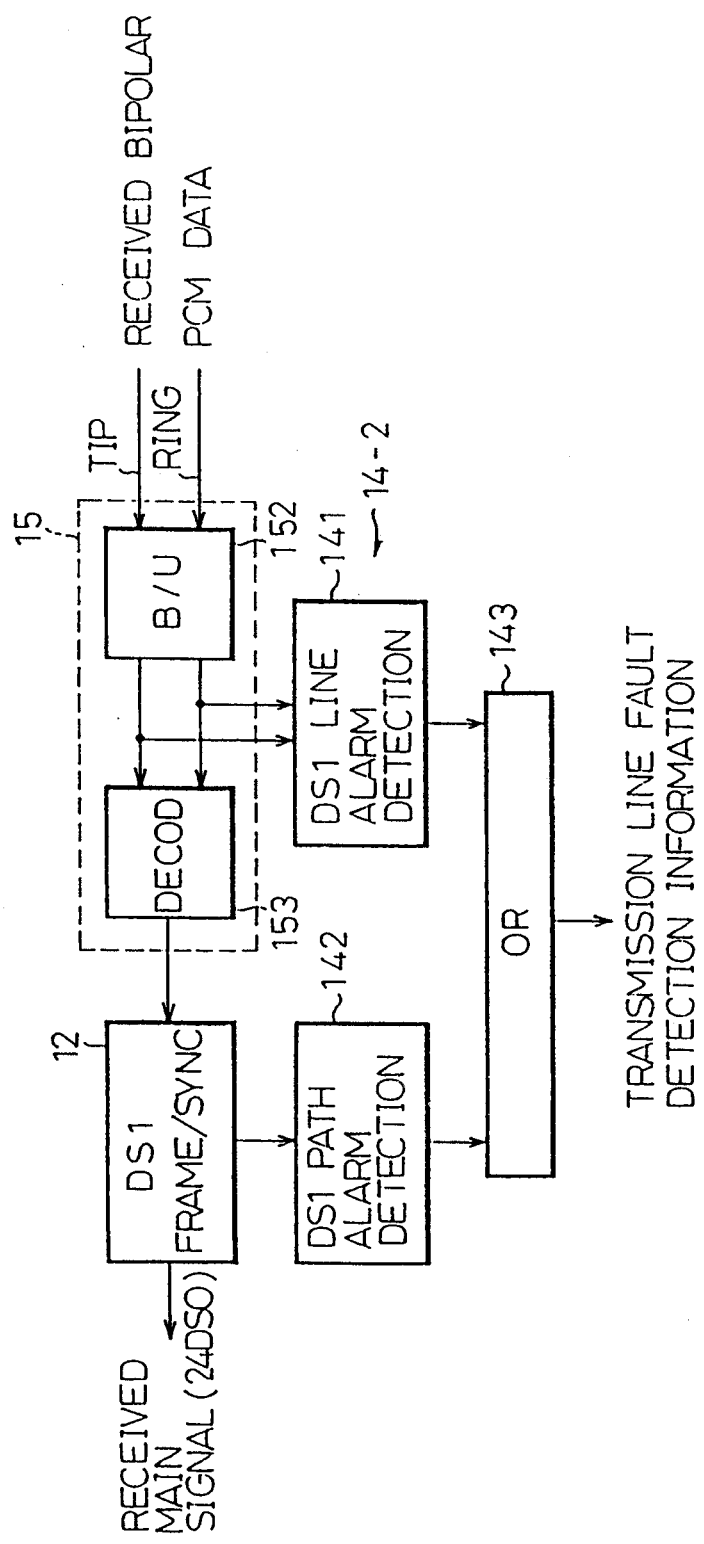

FIG. 19 is a view showing a concrete example of the transmission line fault detection unit 14-1 and the vicinity thereof. The signal format on the feeder transmission line is a bipolar format using a two-wire tip/ring. This is converted to a unipolar signal at the bipolar/unipolar conversion unit 152. Also, this unipolar signal is subjected to code conversion so as not to become a series of "0" for ensuring the clock component, and therefore this is decoded by a decoder (DECOD) 153. A line alarm detection unit 141 in the transmission line fault detection unit 14-2 detects the transmission line side alarm of the reception signal, such as a loss of signal, transmission line error (bipolar violation: code regulation error), etc. Also, the other path alarm detection unit 142 generates an alarm when detection is made of an alarm of a reception signal in the remote terminal equipment, for example, a loss of frame, AIS state (the density of data 1 in a certain pulse number is 99.9% or more in the reception signal), CRC-6 error, or the like. An alarm from the above-described detection units 141 and 142 is passed through the OR gate 143 and becomes the transmission line fault detection information.

Figure 20:
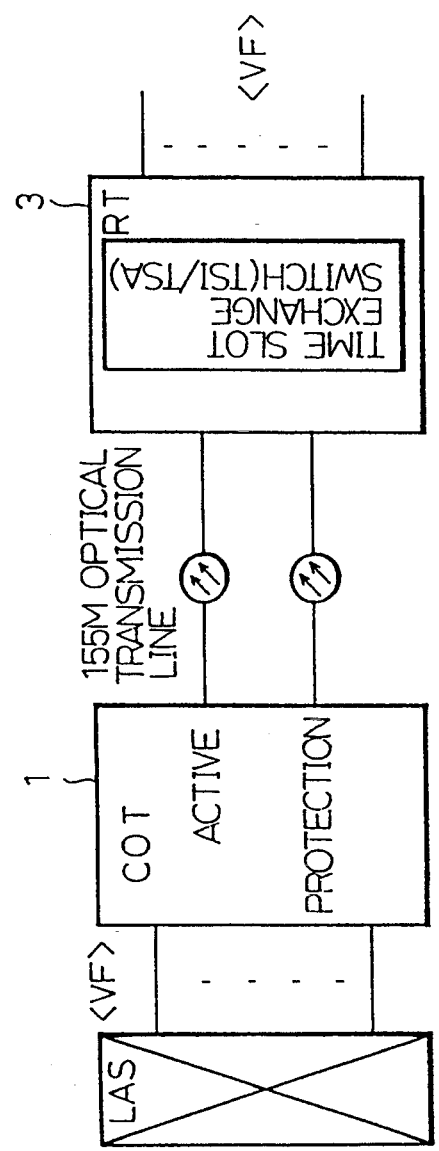
Figure 21:
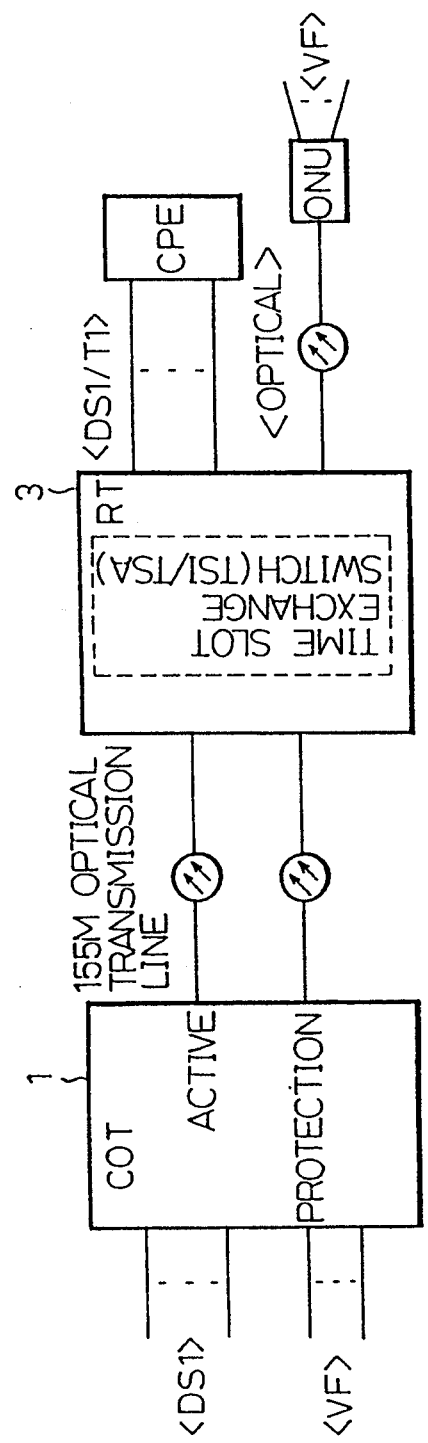

FIG. 20 and FIG. 21 are views showing examples of the first and second systems to which the present invention is applied and correspond to one example of the next generation subscriber system digital transmission apparatus shown in FIG. 5. FIG. 20 replaces the 28 copper wires in FIG. 5 by a large capacity optical transmission line. Also, FIG. 21 realizes a variety of subscriber service by the system of FIG. 20. In the figures, a block CPE is a customer premise equipment, using which the subscriber can directly receive a T1 signal (not terminating the same once at RT). Also, the block ONU is an optical network unit, which transmits information as an optical signal to the subscriber group positioned further away than RT.

Also, in the systems of FIG. 20 and FIG. 21, after the signal of the optical transmission line is demultiplexed to signals of 28 lines indicated in FIG. 5, a selector function unit having the same structure as that of the aforementioned selector function unit 31 can be adopted.

As explained above, according to the present invention, any change-over between the active and protection lines becomes possible just by introducing a simple hardware (switch function unit 31) comprising a logic circuit. Also, that switch function unit is common to all feeder transmission lines, and it is not necessary to treat the same separately for active and protection lines. Further, it is possible to flexibly deal with the digital transmission apparatuses for subscribers having various modes just by slightly changing the processing program in the switch control unit 51.

I claim:

1. A digital transmission apparatus for transmission signals of a plurality of remote subscribers, said signals being multiplexed and transmitted in respective time slots, comprising:

subscriber side transmission lines for disposition between a remote terminal and a plurality of remote subscriber locations and wired to said remote subscriber locations;

a plurality of feeder transmission lines wired to said remote terminal, in normal operation a pre-selectable quantity out of said plurality of feeder transmission lines being inactive and the remainder of said plurality being active, any number of individual lines in a feeder transmission line being pre-selectable to be inactive;

a switch function unit for switching said subscriber time slots for the multiplexed transmission signals to be communicated between said subscriber side transmission lines and said feeder transmission lines;

first means for detecting a transmission fault; and a first selector function unit for effecting connection change-over when a transmission fault occurs in one of said plurality of active feeder transmission lines and is detected by said first means for detecting, said active feeder transmission line in which said transmission fault occurs being made inactive by said first selector function unit, and one said feeder transmission line which had been selected to be inactive being used in place of the faulty feeder transmission line.

2. A digital transmission apparatus for subscribers as in claim 1, further comprising a change-over control unit which outputs connection information for said connection change-over to said first selector function unit in accordance with related transmission fault information when said transmission fault is detected by said first means for detecting said fault.

3. A digital transmission apparatus for subscribers as in claim 2, wherein said change-over control unit includes a management table, and means for recording said connection information in said management table corresponding to each of various types of said transmission fault, and, for updating at the same time, said management table with new connection information when said connection change-over is completed.

4. A digital transmission apparatus for subscribers as in claim 2, wherein said first selector function unit includes a logic gate group corresponding to each of said feeder transmission lines, and each of said logic gate groups receives as its control input said connection information from said change-over control unit and forms a path corresponding to said connection information.

5. A digital transmission apparatus for subscribers as in claim 1, further comprising second means for detecting a transmission fault, and wherein said subscriber side transmission line includes a plurality of individual subscriber side transmission lines, some of which are inactive and the remainder of which are currently active and a second selector function unit, which performs a connection change-over so that when a transmission fault occurs in one said currently used active individual subscriber side transmission line and is detected by said second means for detecting, said currently active individual subscriber side transmission line in which said transmission fault occurs becomes inactive, and one said subscriber side transmission line which has been inactive is used in place of the faulty line, and is inserted between said switch function unit and said subscriber side transmission line.

6. A digital transmission apparatus for subscribers as in claim 2, wherein said means for detecting includes a transmission line fault detection unit associated with said feeder transmission line, when a transmission fault occurs in one said feeder transmission line, information on that transmission fault is transferred from said transmission line fault detection unit to said change-over control unit.

7. A digital transmission apparatus for subscribers as in claim 6, wherein said transmission line fault detection unit includes a line alarm detection unit which detects the transmission line side fault of the reception signal and generates an alarm, and a path alarm detection unit which detects the fault of the reception signal in the remote terminal equipment and generates an alarm, and when one or more of these alarms is generated, information on the related transmission fault is transferred from said transmission line fault detection unit to said change-over control unit.

8. A digital transmission apparatus for subscribers as in claim 3, wherein preliminary allocation is made by preliminary allocation means for determining to which protection transmission line each feeder transmission line is to change-over should a fault occur, and wherein the content of this allocation is used in the aforesaid connection information.

9. A digital transmission apparatus for subscribers as in claim 8, further comprising an host computer performing functions of said preliminary allocation means, and wherein said connection information is set by said host computer exercising general control over the related digital transmission apparatus for subscribers, and when that setting is not determined, set-up of the digital transmission apparatus for subscribers is carried out using default values.

10. A digital transmission apparatus for subscribers as in claim 4, wherein said selector function unit comprises an N:N selector which performs route selection to any N output by receiving as its input the N (N is the number of feeder transmission lines) output from the aforesaid switch function unit, said N:N selector having N N:1 selectors, and each said N:1 selector receives a selector control signal as said connection information from said change-over control unit and is controlled by said selector control signal.

11. A digital transmission apparatus for subscribers as in claim 10, wherein said selector control signal comprises a plurality of bits of signals and determines which route is to be selected based upon various types of logic patterns comprising a combination of logics "1" and "0" of said bits.

12. A digital transmission apparatus for subscribers as in claim 1, wherein said digital transmission apparatus for subscribers includes a next generation digital loop carrier NGDLC subscriber system digital transmission apparatus.

13. A digital transmission apparatus for subscribers as in claim 1, wherein said switch function unit includes a time slot interchange unit (TSI) and a time slot assignment unit (TSA).

* * * * *